(12) United States Patent
Guo et al.

(10) Patent No.: US 12,514,395 B2
(45) Date of Patent: Jan. 6, 2026

(54) UNCOVERING DEVICE OF CAPSULE COFFEE MACHINE AND CAPSULE COFFEE MACHINE

(71) Applicant: GUANGDONG BAISHENGTU TECHNOLOGY CO., LTD., Guangdong (CN)

(72) Inventors: Jiangang Guo, Guangdong (CN); Feng Rao, Guangdong (CN); Jiawei Liao, Guangdong (CN)

(73) Assignee: GUANGDONG BAISHENGTU TECHNOLOGY CO., LTD., Foshan Guangdong (CN)

( * ) Notice: Subject to any disclaimer, the term of this patent is extended or adjusted under 35 U.S.C. 154(b) by 853 days.

(21) Appl. No.: 17/772,511

(22) PCT Filed: Nov. 6, 2020

(86) PCT No.: PCT/CN2020/126955
§ 371 (c)(1),
(2) Date: Apr. 28, 2022

(87) PCT Pub. No.: WO2021/103980
PCT Pub. Date: Jun. 3, 2021

(65) Prior Publication Data
US 2022/0346590 A1    Nov. 3, 2022

(30) Foreign Application Priority Data
Nov. 28, 2019 (CN) .......................... 201922118797.6

(51) Int. Cl.
*A47J 31/44* (2006.01)
*A47J 31/36* (2006.01)

(52) U.S. Cl.
CPC ....... *A47J 31/4407* (2013.01); *A47J 31/3633* (2013.01)

(58) Field of Classification Search
CPC . A47J 31/3614; A47J 31/3633; A47J 31/4407
See application file for complete search history.

(56) References Cited

U.S. PATENT DOCUMENTS

2005/0223904 A1* 10/2005 Laigneau ............ A47J 31/0647
206/0.5
2006/0048650 A1* 3/2006 Laigneau ............ A47J 31/5253
99/295

(Continued)

FOREIGN PATENT DOCUMENTS

CN          208851232 U      5/2019

*Primary Examiner* — John J Norton

(57) ABSTRACT

An uncovering device of a capsule coffee machine, includes a machine body; a first brewing assembly provided in the machine body, the first brewing assembly which includes a brewing head and a brewing seat, a cover body assembly, a sealing cover, a sliding groove extending from the rear side to the front side of the cover body assembly provided in the lower cover, a sliding shaft provided in the sliding cavity, a connecting rod assembly, wherein both ends of the sliding shaft are located at the opposite sides of the sliding groove; wherein one end of the connecting rod assembly is rotatably connected to the sliding shaft through the sliding groove, another end of the connecting rod is rotatably connected to the brewing seat or the brewing head of the first brewing.

10 Claims, 14 Drawing Sheets

(56) References Cited

U.S. PATENT DOCUMENTS

| | | | |
|---|---|---|---|
| 2009/0308259 A1* | 12/2009 | Hiron | A47J 31/58 |
| | | | 99/323.3 |
| 2013/0189400 A1* | 7/2013 | Pribus | B65D 85/8055 |
| | | | 426/115 |
| 2017/0251866 A1* | 9/2017 | Garcia | A47J 31/4403 |
| 2018/0078086 A1* | 3/2018 | Affolter | A47J 31/461 |

* cited by examiner

UNCOVERING DEVICE OF CAPSULE COFFEE MACHINE AND CAPSULE COFFEE MACHINE

TECHNICAL FIELD

The present utility model relates to the technical field of small household appliances, in particular to an uncovering device of a capsule coffee machine and a capsule coffee machine.

BACKGROUND ART

With the improvement of living standards and quality of life of people, capsule coffee machines gradually become a necessity of life for people's homes. The uncovering device of the existing capsule coffee machine typically actuates a brewing assembly through a handle linkage mechanism to brew coffee capsules, which can only be used for one type of coffee machines or one type of capsule but cannot meet the demands of different groups of people.

Chinese patent application with the publication number of CN208851232U discloses a dual-drive brewing device of a beverage preparation machine, which can prepare two cups of beverage at the same time or prepare mixed beverage by one-button operation. Although its preparation efficiency is improved and different demands in different environments are met, the dual-drive brewing device is driven by a gear mechanism, which is complex in structure and low in operational reliability.

SUMMARY

In view of the above-mentioned problems existing in the prior art, the purpose of the embodiment of the present utility model is to provide an uncovering device of a capsule coffee machine which is ingenious and reasonable in structural design and convenient to operate.

The embodiment of the present utility model provides an uncovering device of a capsule coffee machine, wherein the capsule coffee machine comprises a machine body and a first brewing assembly provided in the machine body, the first brewing assembly comprises a brewing head and a brewing seat, wherein the uncovering device comprises:

- a cover body assembly, which is pivoted to the machine body at the rear side and comprises an upper cover and a lower cover which are fastened to each other, a sealing cover which cooperates with the inner surface of the lower cover to define a sliding cavity is provided between the upper cover and the lower cover, a sliding groove extending from the rear side to the front side of the cover body assembly is provided in the lower cover, and the sliding groove is in communication with the sliding cavity;
- a sliding shaft, which is provided in the sliding cavity, wherein both ends of the sliding shaft are located at the opposite sides of the sliding groove; and
- a connecting rod assembly, wherein one end of the connecting rod assembly is rotatably connected to the sliding shaft through the sliding groove, the other end of the connecting rod is rotatably connected to the brewing seat or the brewing head of the first brewing assembly so as to drive the sliding shaft to move in the sliding cavity in a length direction of the sliding groove and drive the connecting rod assembly to move when the cover body assembly is closed and opened, so that the connecting rod assembly drives the brewing seat or the brewing head to move transversely to achieve combination or separation of the brewing seat and the brewing head.

The uncovering device according to the embodiment of the present utility model uses the closing and opening of the cover body assembly to drive the connecting rod assembly to push the brewing seat or the brewing head to move, so that the brewing assembly compresses the coffee capsule and brews the high-pressure Italian coffee. The uncovering device is reasonable in structural design, simple in operation mode, and convenient for popularization and application.

In some embodiments, the uncovering device comprises two sliding grooves provided in parallel and two connecting rod assemblies provided in one-to-one correspondence with the two sliding grooves; and the machine body is provided with two first brewing assemblies provided in one-to-one correspondence with the connecting rod assemblies. According to the actual needs, the number of connecting rod assemblies can be freely combined to make a larger amount of Italian coffee, so as to meet the demands of many people drinking at the same time and reduce the waiting time.

In some embodiments, the lower cover is provided with a piercing needle; the machine body is further provided with a second brewing assembly, and the capsule inlet of the second brewing assembly is provided towards the lower cover, so that when the cover body assembly is closed, the piercing needle extends into the second brewing assembly through the capsule inlet and pierces the coffee capsule in the second brewing assembly. A water outlet needle and a connecting rod assembly are simultaneously provided on the uncovering assembly, so that when the uncovering device is closed, the water outlet needle pierces American coffee capsules to brew American coffee. At the same time, the connecting rod assembly pushes the brewing seat and the brewing head to move relatively to squeeze the coffee capsule and brew Italian coffee.

In some embodiments, the connecting rod assembly comprises a first connecting rod, a second connecting rod and a third connecting rod, the first connecting rod comprises a first arm and a second arm, one end of the first arm is rotatably connected to the sliding shaft through the sliding groove, the other end of the first arm is connected to one end of the second arm and forms an inflection point, and the other end of the second arm is rotatably connected to a first rotating shaft provided on the brewing seat; one end of the second connecting rod is rotatably connected to the first arm through a second rotating shaft, the other end of the second connecting rod is rotatably connected to one end of the third connecting rod, and the other end of the third connecting rod is rotatably connected to the brewing seat. The connecting rod assembly is reasonable in structural design, saving space, and convenient to convert the movement of the cover body assembly into the movement of the connecting rod assembly, which is transmitted to the brewing seat or the brewing head, so that the brewing seat and the brewing head can move relatively to brew delicious coffee.

In some embodiments, the top of the machine body is provided with a locking groove; the uncovering device further comprises a locking assembly provided on the cover body assembly, the locking assembly comprises:

- a limit sliding groove, which is provided on the inner surface of the lower cover;
- a sliding member, which is provided in the limit sliding groove and is capable of moving back and forth in the limit sliding groove;
- a pulling member, which is rotatably provided on the upper cover, so that one end of the pulling member forms a pulling part, and the other end of the pulling member forms a pushing part which rotates downwards when the pulling part is pulled upwards, and the pushing part is configured to push the sliding member to move back and forth in the limit sliding groove;

a reset member, both ends of which act on the sliding member and the lower cover, respectively, to exert an acting force on the sliding member to move backward; and a locking member, which is provided between the upper cover and the lower cover and linked with the sliding member to push the locking member to move back and forth when the sliding member moves back and forth to lock or unlock the locking groove.

The uncovering device of this embodiment is provided with the locking assembly, so that the uncovering device can be locked on the machine body, and the safety of the coffee making process is ensured.

In some embodiments, the sliding member comprises a slider and a connecting part convexly provided on the slider, and the connecting part is provided with two through holes; there are two locking members which are provided with long holes, respectively;

the locking assembly further comprises two rotating rods, the two rotating rods are rotatably connected to the lower cover through a shaft rod penetrating through the middle of the rotating rods, two protruding posts are provided at both ends of the rotating rod, respectively, one of the protruding posts penetrates through the through hole, the other of the protruding posts penetrates through the long hole to drive the rotating rod to rotate when the sliding member moves back and forth, and the rotating rod drives the locking member to move back and forth during rotation to lock or unlock the locking groove.

The sliding member simultaneously drives the two rotating rods to rotate synchronously, and drives the two locking members to lock or unlock synchronously, thus ensuring the stability and reliability of locking.

In some embodiments, the peripheral edges of the upper cover except the pivoting side are all raised upwards to form flanges, the flange on the side far away from the pivoting side is provided with a gap, the upper cover is provided with a notch near the gap, the pulling member is pivoted to the notch, the pulling part is provided in the gap and protrudes from the front side of the upper cover, and when the pulling part is pulled upwards, the pushing part is rotatable downwards and enters between the upper cover and the lower cover through the notch to push the sliding member. The special structure of the upper cover is provided so that the pulling member is perfectly combined with the upper cover without destroying its integrity. The structure is ingenious and the design is reasonable, so that the acting force can be reliably transmitted to the sliding member.

In some embodiments, the bottom surface of the lower cover is concave toward the upper cover to form a groove, the front side of the groove is in communication with the outside, the rear side of the groove is provided with a through hole communicating between the upper cover and the lower cover;

the top of the machine body is provided with a boss, the locking groove is provided on the boss, when the cover body assembly is closed, the boss extends into the groove, and the locking member extends into the locking groove through the through hole to realize locking. The locking groove formed on the machine body is opposite to the locking member through concave-convex fit between the machine body and the lower cover, so as to realize locking. Moreover, the locking is hidden therein, which increases the structural integrity.

The embodiment of the present utility model further provides a capsule coffee machine, comprising a machine body in which a first brewing assembly is provided, wherein the capsule coffee machine further comprises the uncovering device of the capsule coffee machine according to any one of claims 1 to 8 hinged to the machine body, the top of the machine body is provided with a through groove, and the connecting rod assembly of the uncovering device is rotatably connected to a brewing seat or a brewing head of the first brewing assembly through the through groove, and drives the brewing seat and the brewing head to move relatively transversely to combine or separate the brewing seat and the brewing head. The capsule coffee machine is reasonable in structural design, convenient to operate, and excellent in user experience.

In some embodiments, the first brewing assembly further comprises two opposite plate holders, opposite guide grooves are provided on the two plate holders, respectively, the length direction of the guide grooves is the same as the relative movement direction of the brewing seat and the brewing head;

the brewing head is provided between the two plate holders and close to one end of the two plate holders on the same side, the brewing seat comprises a seat body and guide sliders provided on opposite sides of the seat body, the guide sliders are provided in the guide grooves, and the connecting rod assembly is rotatably connected to the side of the seat body away from the brewing head, so that when the cover body assembly is closed, the connecting rod assembly drives the guide sliders of the seat body to slide along the guide grooves, so that the brewing seat can stably and smoothly follow a predetermined trajectory, ensuring the smooth progress of coffee brewing.

Compared with the prior art, the uncovering device of the capsule coffee machine and the capsule coffee machine provided by the embodiment of the present utility model are reasonable in structural design, convenient to operate, reliable in performance, capable of making various kinds of coffee simultaneously so as to meet the demands of different groups of people, high in manufacturing efficiency, and reducing the waiting time when many people want to drink coffee at the same time.

It should be understood that both the foregoing general description and the following detailed description are merely exemplary and illustrative, rather than limit the present utility model.

The overview of various implementations or examples of the technology described in the present utility model is not a comprehensive disclosure of the full range or all features of the disclosed technology.

BRIEF DESCRIPTION OF THE DRAWINGS

In the drawings which are not necessarily drawn to scale, the same reference numbers can describe similar parts in different views. The same reference numbers with letter suffixes or different letter suffixes can indicate different examples of similar parts. The drawings generally show various embodiments by way of example rather than limitation, and are used to explain the embodiments of the present utility model, together with the description and claims. Where appropriate, the same reference numbers are used in all drawings to refer to the same or similar parts.

Such an embodiment is illustrative, and is not intended to be an exhaustive or exclusive embodiment of the device or method.

REFERENCE NUMBER

Figure 1:
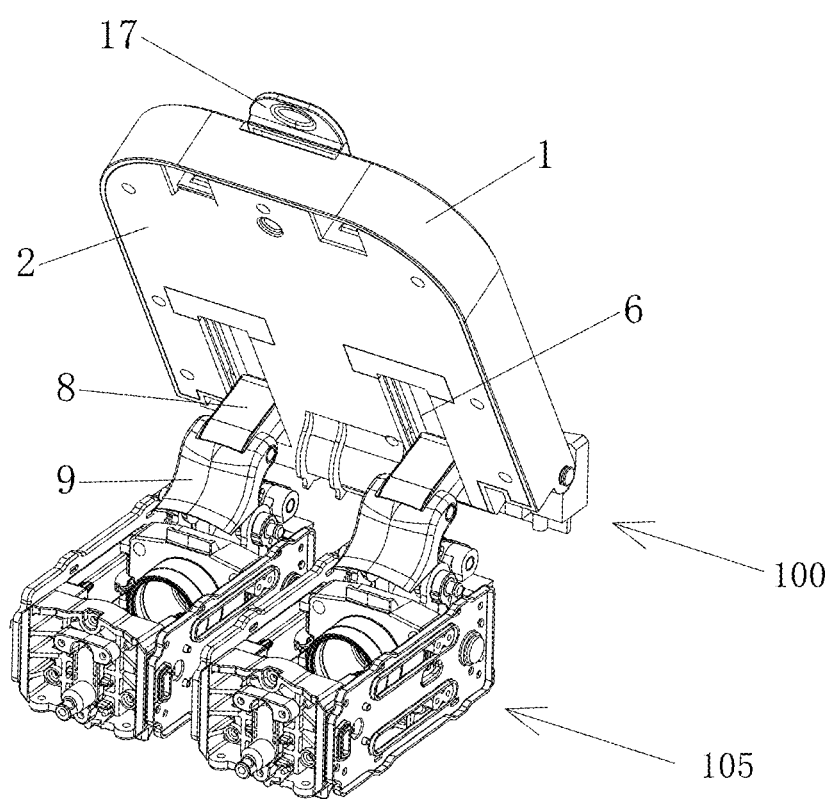
FIG. 1 is a schematic diagram of the three-dimensional structure of an uncovering device of a capsule coffee machine according to the embodiment of the present utility model, in which a brewing assembly is shown.
Figure 2:
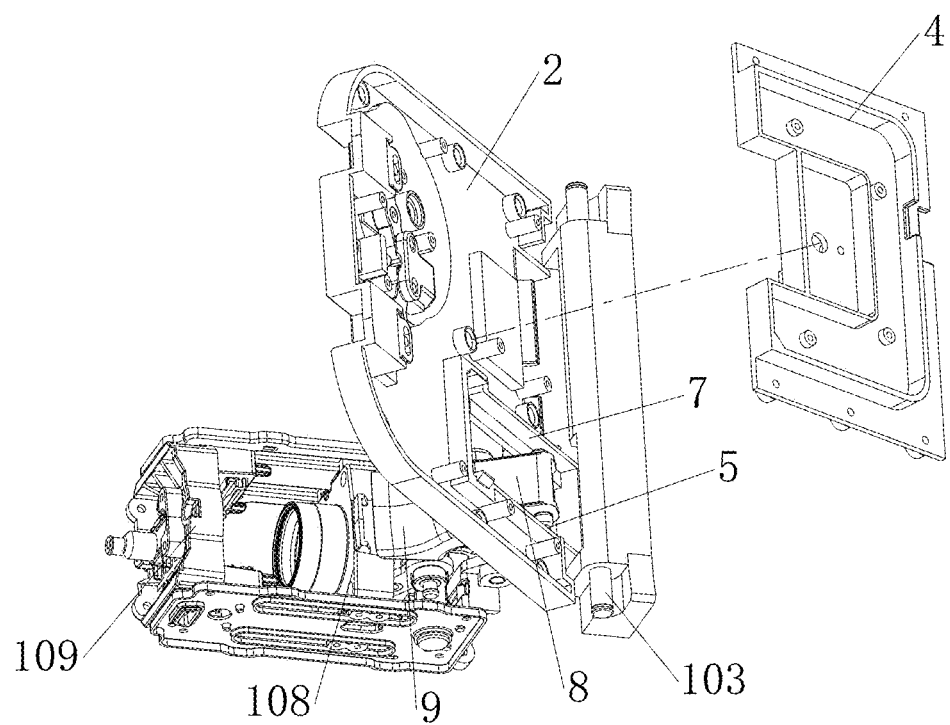
FIG. 2 is a partially exploded schematic diagram of an uncovering device of a capsule coffee machine according to the embodiment of the present utility model.
Figure 3:
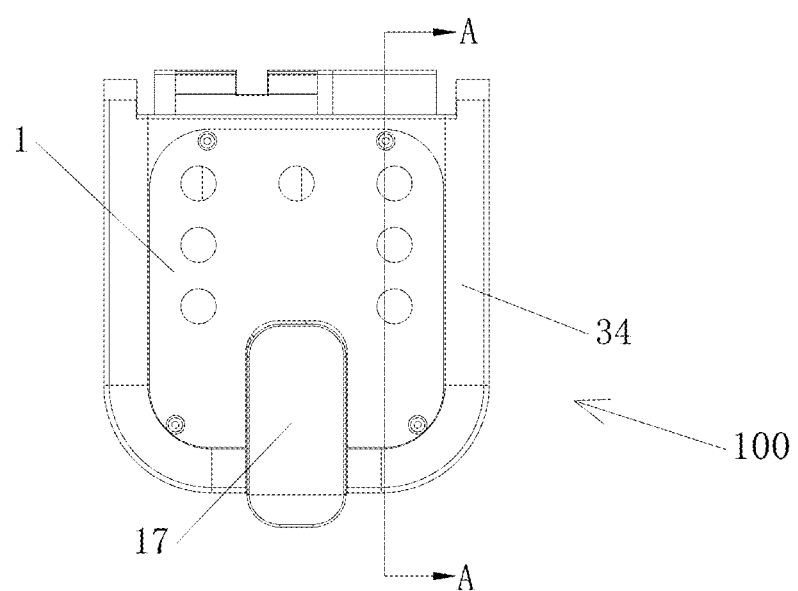
FIG. 3 is a top view of an uncovering device of a capsule coffee machine according to the embodiment of the present utility model.

1—upper cover; 2—lower cover; 3—sliding cavity; 4—sealing cover; 5—sliding shaft; 6—sliding groove; 7—baffle; 8—first connecting rod; 9—second connecting rod; 10—third connecting rod; 11—inflection point; 12—first rotating shaft; 13—second rotating shaft; 14—piercing needle; 15—limit sliding groove; 16—sliding member; 17—pulling member; 18—locking member; 19—reset member; 20—L-shaped stopper; 21—stop block; 22—stop plate; 23—first lug; 24—pushing block; 25—pulling part; 26—rotating shaft; 27—slider; 28—connecting part; 29—through hole; 30—long hole; 31—rotating rod; 32—shaft rod; 33—protruding post; 34—flange; 35—gap; 36—notch; 37—groove;
100—uncovering device;
101—machine body; 102—rotating shaft seat; 103—pivot; 104—through groove; 105—first brewing assembly; 106—second brewing assembly; 107—brewing head; 108—brewing seat; 109—capsule inlet; 110—coffee capsule; 111—boss; 112—locking groove; 113—plate holder; 114—guide groove; 115—seat body; 116—guide slider.

DETAILED DESCRIPTION OF THE EMBODIMENTS

In order to make the purpose, the technical scheme and the advantages of the embodiment of the present utility model clearer, the technical scheme of the embodiment of the present utility model will be clearly and completely described with reference to the drawings of the embodiment of the present utility model. Obviously, the described embodiments are part of the embodiments of the present utility model, rather than all of the embodiments. Based on the described embodiments of the present utility model, all other embodiments obtained by those skilled in the art without creative labor fall within the scope of protection of the present utility model.

Unless otherwise defined, the technical terms or scientific terms used in the present utility model should have the ordinary meaning understood by those skilled in the field to which the present utility model belongs. Similar words such as "first", "second" used in the present utility model do not indicate any order, number or importance, but are only used to distinguish different components. Similar words such as "comprising" or "including" mean that the elements or objects appearing before the word cover the elements or objects listed after the word and their equivalents without excluding other elements or objects. Similar words such as "connected" or "linked" are not limited to physical or mechanical connections, but can include electrical connections, whether direct or indirect. "up", "down", "left" and "right" are only used to indicate the relative positional relationship. After the absolute position of the described object changes, the relative positional relationship may also change accordingly.

In order to keep the following description of the embodiment of the present utility model clear and concise, the present utility model omits the detailed description of known functions and known components.

As shown in FIG. 1 to FIG. 16, the embodiment of the present utility model provides an uncovering device of a capsule coffee machine, wherein the capsule coffee machine comprises a machine body 101 and a first brewing assembly 105 provided in the machine body 101, and the first brewing assembly 105 comprises a brewing head 107 and a brewing seat 108, as shown in FIG. 1 to FIG. 6. The uncovering device comprises a cover body assembly, a sliding shaft 5 and a connecting rod assembly. The cover body assembly is pivoted to the machine body 101 at the rear side. In this embodiment, the rear side of the machine body 101 is provided with a rotating shaft seat 102, and the cover body assembly is pivoted to the rotating shaft seat 102 through a pivot 103. The cover body assembly comprises an upper cover 1 and a lower cover 2 which are fastened to each other. A sealing cover 4 which cooperates with the inner surface of the lower cover 2 to define a sliding cavity 3 is provided between the upper cover 1 and the lower cover 2. A sliding groove 6 extending from the rear side to the front side of the cover body assembly is provided in the lower cover 2. The sliding groove 6 is in communication with the sliding cavity 3. The sliding shaft 5 is provided in the sliding cavity 3. Both ends of the sliding shaft are located at the opposite sides of the sliding groove 6. The connecting rod assembly comprises a plurality of connecting rods hinged in sequence. One end of the connecting rod assembly is rotatably connected to the sliding shaft 5 through the sliding groove 6, and the other end of the connecting rod is rotatably connected to the brewing seat 108 or the brewing head 107 of the first brewing assembly 105 so as to drive the sliding shaft 5 to move in the sliding cavity 3 in a length direction of the sliding groove 6 and drive the connecting rod assembly to move when the cover body assembly is closed and opened, so that the connecting rod assembly drives the brewing seat 108 or the brewing head 107 to move transversely to achieve combination or separation of the brewing seat and the brewing head.

The uncovering device 100 according to the embodiment of the present utility model uses the closing and opening of the cover body assembly to drive the connecting rod assembly to push the brewing seat 108 or the brewing head 107 to move, so that the brewing assembly compresses the coffee capsule 110 and brews the high-pressure Italian coffee. The uncovering device is reasonable in structural design, simple in operation mode, and convenient for popularization and application.

It should be noted that the front and back indicated in the present utility model are the same as the front and back of the capsule coffee machine. The capsule coffee machine faces the side of the operator during use, that is, the side where coffee comes out is the front side, and the opposite side of the front side is the rear side.

In order to provide the sliding shaft 5 in the sliding cavity 3, the sliding shaft 5 cannot move arbitrarily, but can only move in the length direction of the sliding groove 6 in the sliding cavity 3, so as to drive the connecting rod assembly to follow a predetermined trajectory. The sliding cavity 3 is provided with baffles 7 located on both sides of the sliding groove 6. The baffles 7 are provided with guide grooves (not shown in the figure) which are the same as the extending direction of the sliding groove 6. Both ends of the sliding shaft 5 are provided in the guide grooves, and are limited in the guide grooves by a stopper, so that the sliding shaft 5 can only move along the sliding groove 6, but cannot move in the direction perpendicular to the length direction of the guide groove.

The specific structure of the connecting rod assembly is not limited, and can be selected according to the actual situation. In some embodiments, with continued reference to FIG. 3 to FIG. 6, the connecting rod assembly comprises a first connecting rod 8, a second connecting rod 9 and a third connecting rod 10. The first connecting rod 8 comprises a first arm and a second arm. One end of the first arm is rotatably connected to the sliding shaft 5 through the sliding groove 6. The other end of the first arm is connected to one end of the second arm and forms an inflection point 11. The other end of the second arm is rotatably connected to a first rotating shaft 12 provided on the brewing seat 108. That is, the first connecting rod 8 in this embodiment is approximately L-shaped. One end of the second connecting rod 9 is rotatably connected to the first arm through a second rotating shaft 13. The other end of the second connecting rod 9 is rotatably connected to one end of the third connecting rod 10. The second connecting rod 9 in this embodiment is also non-linear, and is provided with a convex part to form a hinge part hinged with the third connecting rod 10. The other end of the third connecting rod 10 is rotatably connected to the brewing seat 108. The connecting rod assembly is reasonable in structural design, saving space, and convenient to convert the movement of the cover body assembly into the movement of the connecting rod assembly, which is transmitted to the brewing seat 108 or the brewing head 107, so that the first brewing assembly 105 compresses the coffee capsule 110 to brew delicious coffee.

In order to improve the brewing efficiency and meet the demands of many people drinking coffee at the same time, in some embodiments, as shown in FIG. 1, the uncovering device 100 comprises two sliding grooves 6 provided in parallel and two connecting rod assemblies provided in one-to-one correspondence with the two sliding grooves 6; and the machine body 101 is provided with two first brewing assemblies 105 provided in one-to-one correspondence with the connecting rod assemblies. One coffee capsule 110 is placed in each first brewing assembly 105. When the cover body assembly is closed, the two connecting rod assemblies can be simultaneously driven to push the brewing seats 108 or brewing heads 107 of the two first brewing assemblies 105 to move, so as to realize simultaneous brewing of two coffee capsules 110. When many people want to drink coffee at the same time, they need not to wait too long, which saves time and improves the customer experience.

Figure 6:
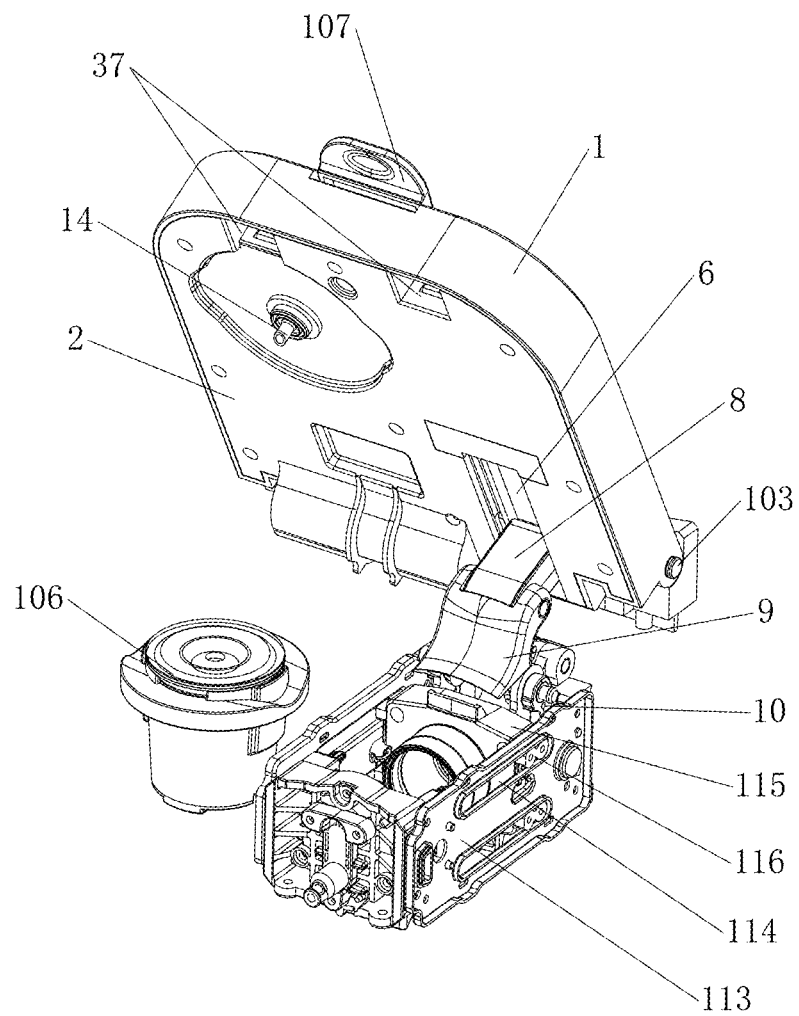
FIG. 6 is a schematic diagram of the three-dimensional structure of another uncovering device of a capsule coffee machine according to the embodiment of the present utility model, in which a brewing assembly is shown.

In order to make a coffee machine brew different flavors of coffee, improve the utilization rate of the coffee machine and meet the demands of different groups of people, in some embodiments, as shown in FIG. 6, the lower cover 2 is provided with a piercing needle 14; the machine body 101 is further provided with a second brewing assembly 106, and the capsule inlet 109 of the second brewing assembly 106 is provided towards the lower cover 2, so that when the lower cover 2 is closed, the piercing needle 14 extends into the second brewing assembly 106 through the capsule inlet 109 and pierces the coffee capsule 110 in the second brewing assembly, so as to brew American coffee.

Figure 4:
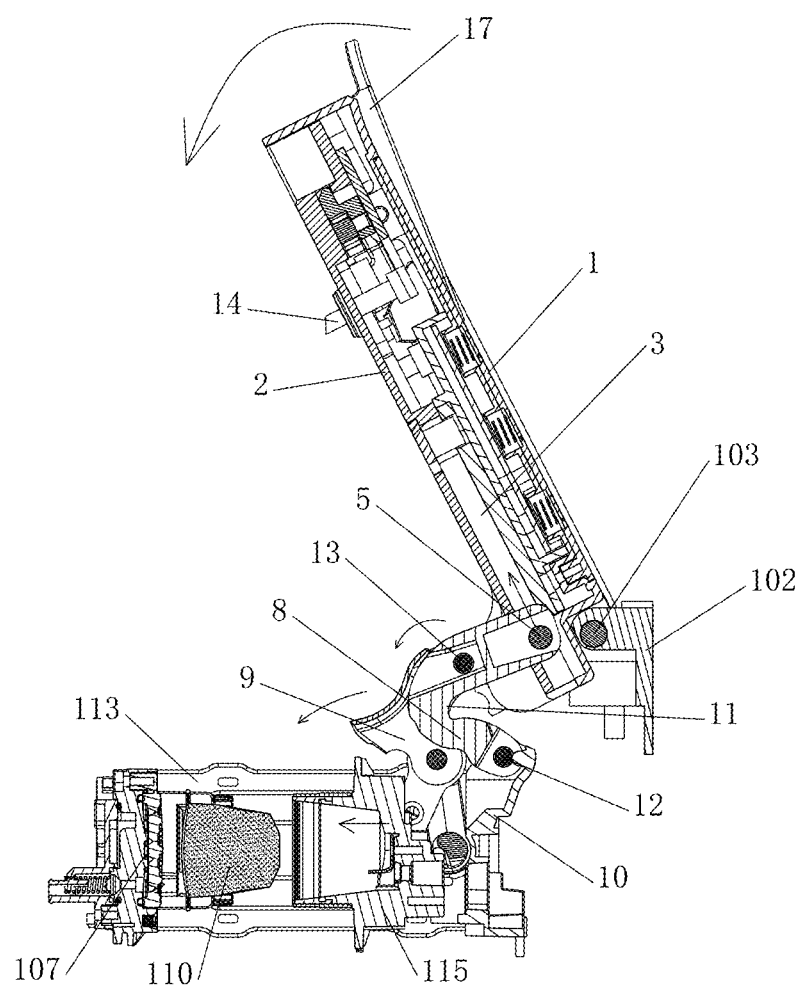
FIG. 4 is a sectional view taken along the line A-A of FIG. 3, in which a cover body assembly is in an open state.
Figure 5:
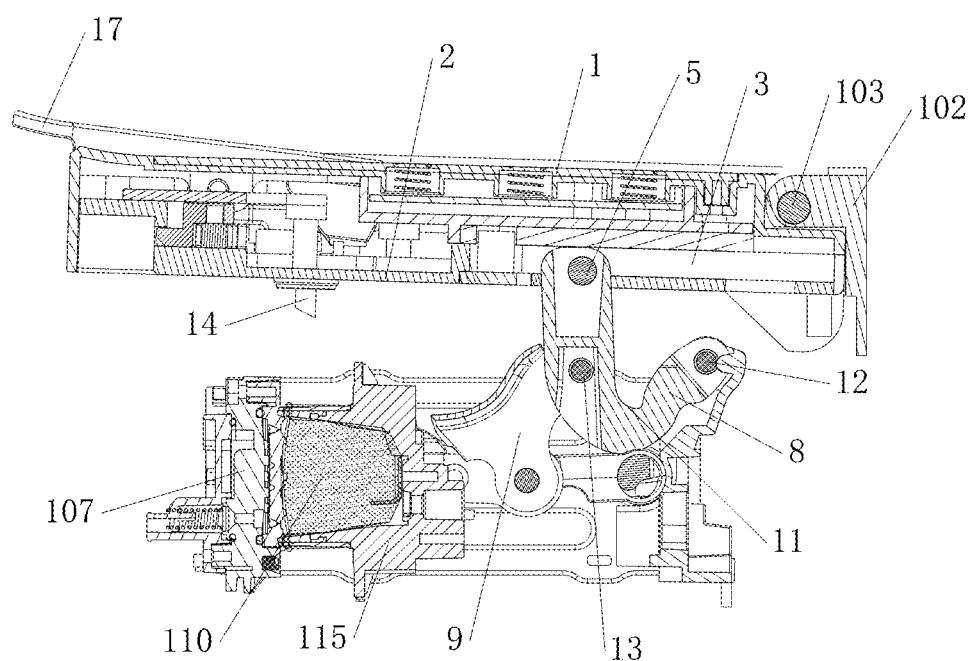
FIG. 5 is a sectional view taken along the line A-A of FIG. 3, in which a cover body assembly is in a closed state.

With continued reference to FIG. 4 to FIG. 6, the coffee capsules 110 in the first brewing assembly 105 are provided transversely, and the relative movement between the brewing base 108 and the brewing head 107 is also transverse. The coffee capsules 110 in the second brewing assembly 106 are vertically provided, and the piercing needle 14 pierces the coffee capsules 110 vertically.

Figure 7:
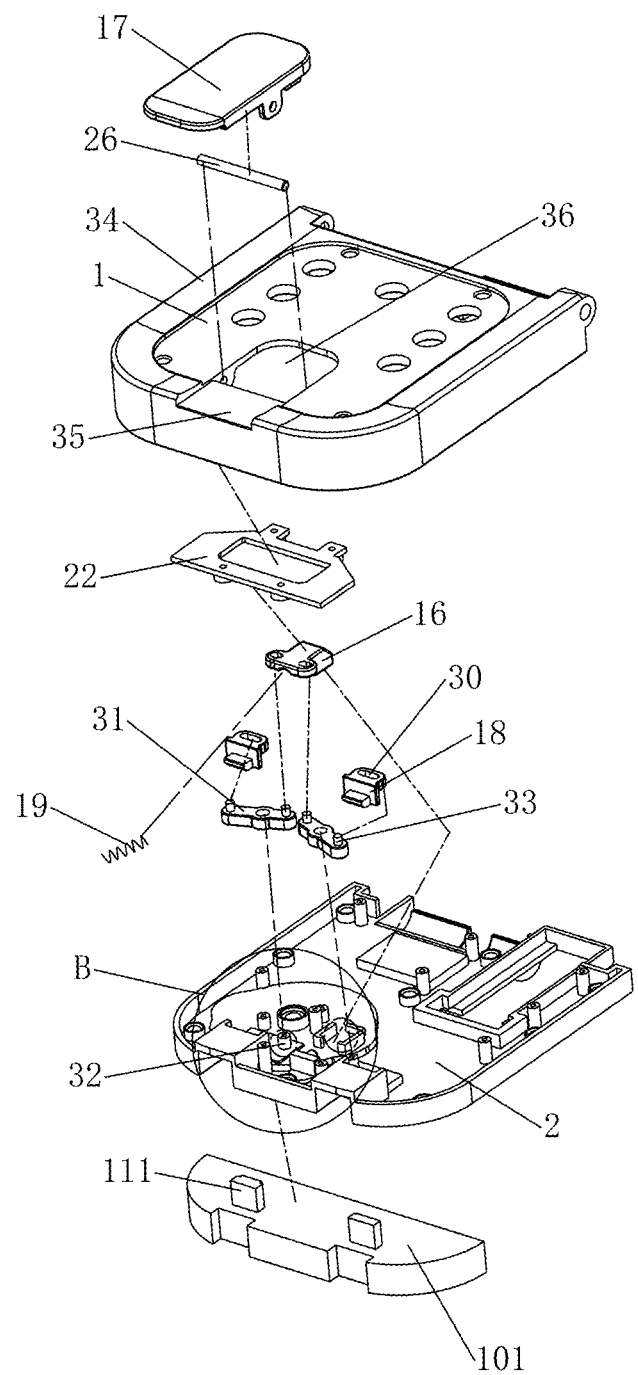
FIG. 7 is an exploded schematic diagram of a partial structure of an uncovering device of a capsule coffee machine according to the embodiment of the present utility model.
Figure 8:
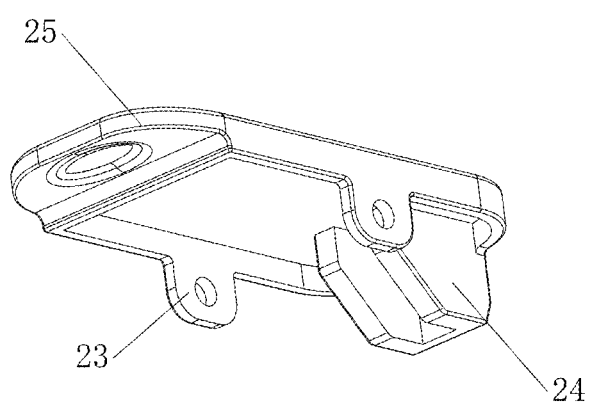
FIG. 8 is an enlarged view of part B in FIG. 7.

In some embodiments, the uncovering device 100 further comprises a locking assembly. The top of the machine body 101 is provided with a locking groove 112 matched with the locking assembly to lock the cover body assembly on the machine body 101 when the cover body assembly is closed, so as to ensure the safety of the coffee making process. Specifically, as shown in FIG. 7 to FIG. 16, the locking assembly comprises a limit sliding groove 15, a sliding member 16, a pulling member 17, a locking member 18 and a reset member 19. The limit sliding groove 15 is provided on the inner surface of the lower cover 2. The limit sliding groove 15 in this embodiment is defined by L-shaped stoppers 20 symmetrically provided and a stop block 21 provided between one ends of the L-shaped stoppers 20, as shown in FIG. 8. The sliding member 16 is provided in the limit sliding groove 15 and is capable of moving back and forth in the limit sliding groove 15. The sliding member 16 cannot move left and right under the restriction of the L-shaped stopper 20, and the stop block 21 and the notch 36 of the limit sliding groove 15 limit the stroke of the sliding member 16 to move back and forth within a predetermined range without being disengaged from the limit sliding groove 15. In addition, the limit sliding groove 15 is further provided with a stop plate 22 to cover the limit sliding groove 15 using the sealing cover 4 from above, so as to further limit the sliding member 16 from above and limit the sliding member in the limit sliding groove 15. The pulling member 17 is rotatably provided on the upper cover 1, so that one end of the pulling member forms a pulling part 25, and the other end of the pulling member forms a pushing part which rotates downwards when the pulling part 25 is pulled upwards. The pushing part is configured to push the sliding member 16 to move back and forth in the limit sliding groove 15. Both ends of the reset member 19 act on the sliding member 16 and the lower cover 2, respectively, to exert an acting force on the sliding member 16 to move backwards. That is, the reset member 19 exerts an acting force on the sliding member 16 to reset the sliding member. The reset member 19 can be selected according to needs, which is not specifically limited in this embodiment, for example, a reset spring shown in FIG. 7. The locking member 18 is provided between the upper cover 1 and the lower cover 2 and linked with the sliding member 16 to push the locking member 18 to move back and forth when the sliding member 16 moves back and forth to lock or unlock the locking groove 112.

Figure 9:
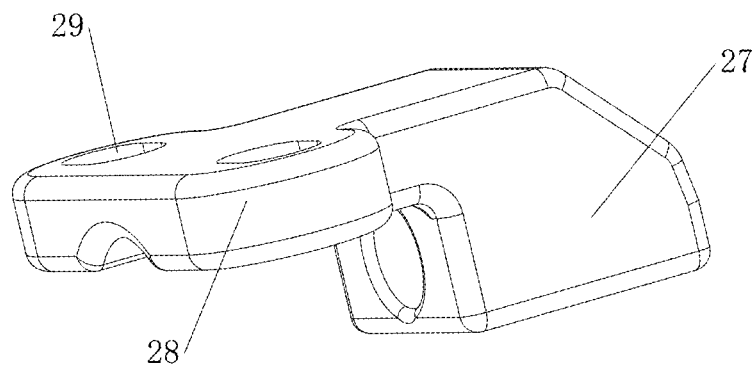
FIG. 9 is a schematic diagram of the three-dimensional structure of a pulling member in an uncovering device of a capsule coffee machine according to the embodiment of the present utility model.

In some embodiments, as shown in FIG. 9, the pulling member 17 is plate-shaped, and corresponding first lugs 23 are provided in the middle of the opposite sides of the pushing member. The rear side of the pulling member 17 is provided with a pushing block 24 protruding downward, so that when the pulling member 25 is pulled, the pushing part passes through the upper cover 1, so that the pushing block 24 is in contact with the sliding member 16 and pushes the sliding member 16 to move back and forth. The front side of the pulling member 17 protrudes from the upper cover 1 to form a pulling member 25 which is convenient to operate.

Figure 10:
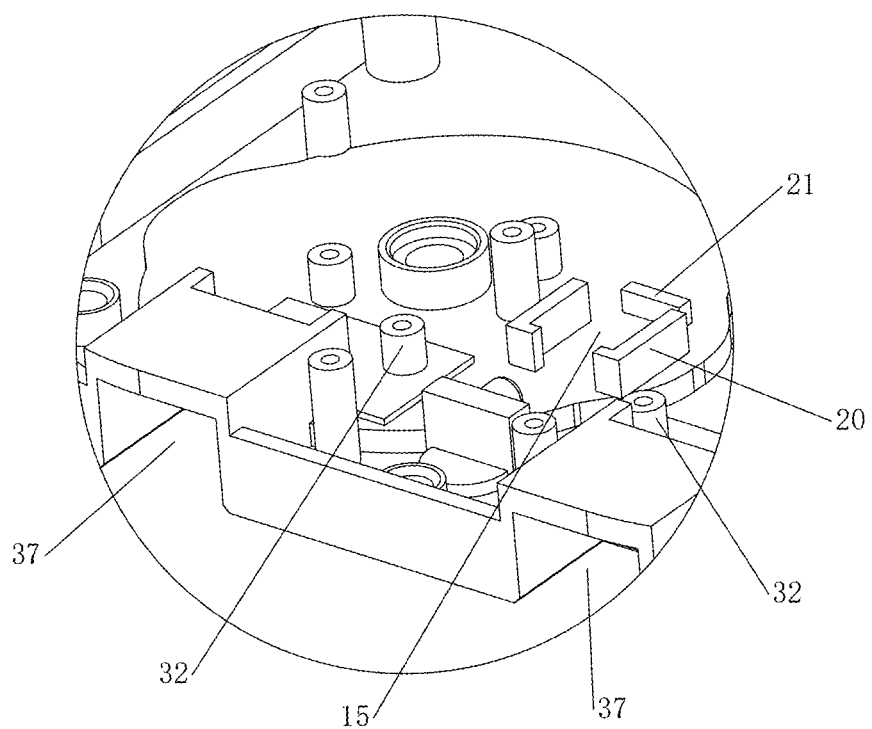
FIG. 10 is a schematic diagram of the three-dimensional structure of a sliding member in an uncovering device of a capsule coffee machine according to the embodiment of the present utility model.

In some embodiments, as shown in FIG. 10, the sliding member 16 comprises a slider 27 and a connecting part 28 convexly provided on the slider 27, and the connecting part 28 is provided with two through holes 29. As shown in FIG. 7, there are two locking members 18 which are provided with long holes 30, respectively; the locking assembly further comprises two rotating rods 31, the two rotating rods 31 are rotatably connected to the lower cover 2 through a shaft rod 32 penetrating through the middle of the rotating rods, two protruding posts 33 are provided at both ends of the rotating rod 31, respectively, one of the protruding posts 33 penetrates through the through hole 29, and the other of the protruding posts 33 penetrates through the long hole 30. When the sliding member 16 moves back and forth under the action of the pulling member 17, the two rotating rods 31 are driven to rotate simultaneously. The protruding post 33 in the long hole 30 slides in the long hole 30. The rotating rod 31 drives the locking member 18 to move back and forth during rotation so as to extend into the locking groove 112 for locking or be disengaged from the locking groove 112 for unlocking.

Figure 11:
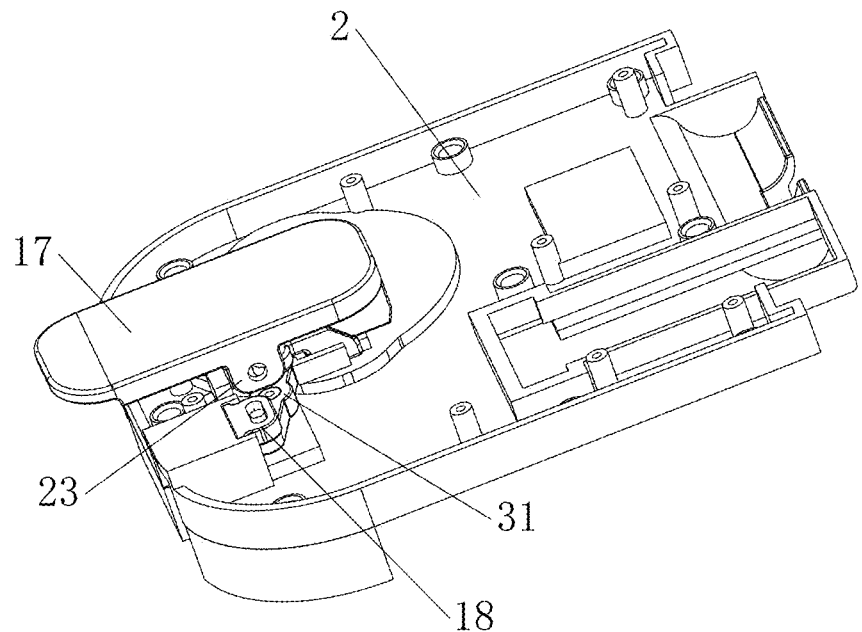
FIG. 11 is a structural schematic diagram of a locking assembly and a lower cover in an uncovering device of a capsule coffee machine according to the embodiment of the present utility model, in which the locking assembly is in a locked state.
Figure 12:
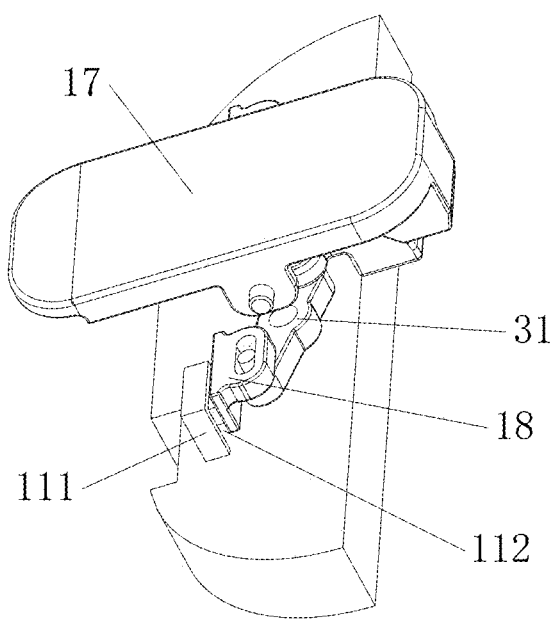
FIG. 12 is a schematic diagram of a partial structure of FIG. 11.
Figure 13:
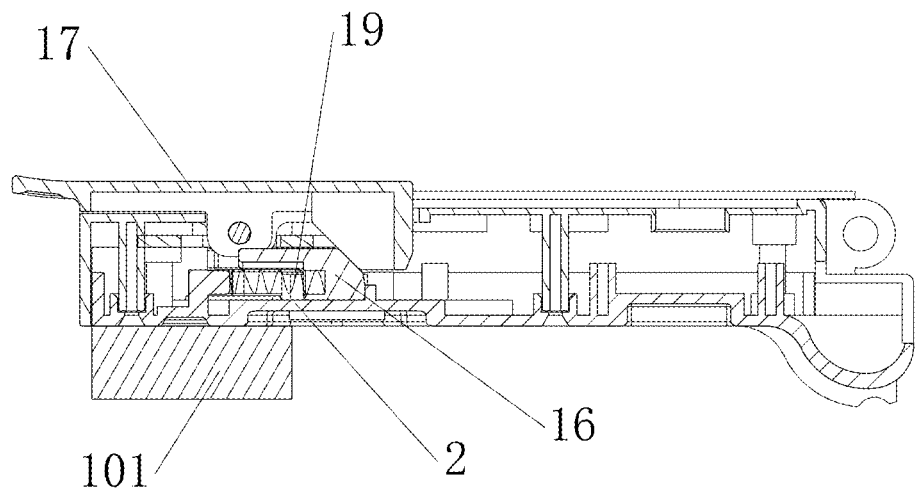
FIG. 13 is a sectional view of an uncovering device of a capsule coffee machine according to the embodiment of the present utility model, in which a locking assembly is in a locked state.
Figure 14:
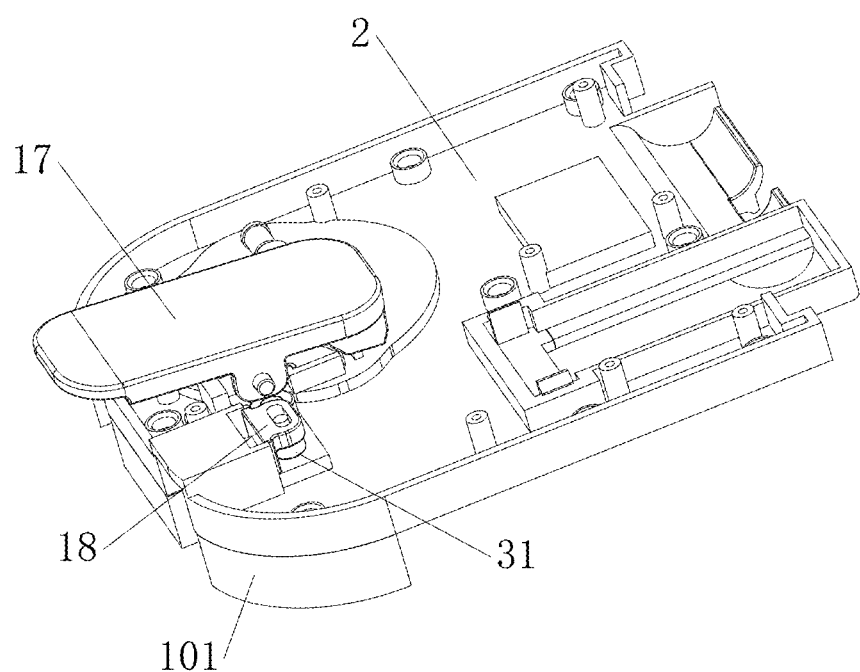
FIG. 14 is a structural schematic diagram of a locking assembly and a lower cover in an uncovering device of a capsule coffee machine according to the embodiment of the present utility model, in which the locking assembly is in an unlocked state.
Figure 15:
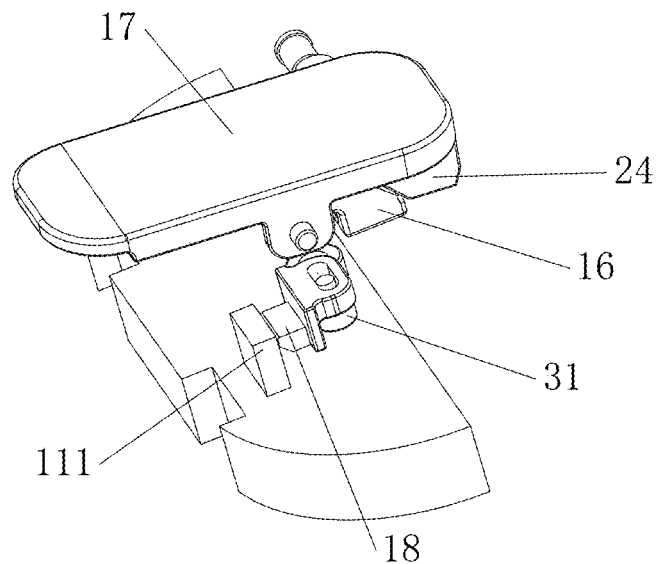
FIG. 15 is a schematic diagram of a partial structure of FIG. 13.
Figure 16:
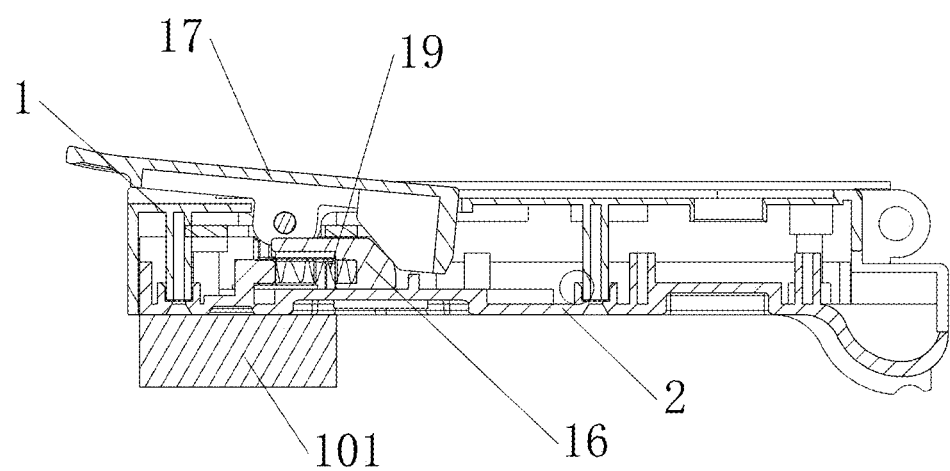
FIG. 16 is a sectional view of an uncovering device of a capsule coffee machine according to the embodiment of the present utility model, in which a locking assembly is in an unlocked state.

As shown in FIG. 11 to FIG. 13, after the assembly of the upper cover 1 is closed, under the action of the reset member 19, the sliding member 16 is in the initial state. Under the action of the sliding member 16, the rotating lever 31 keeps the locking member 18 in the locking position, that is, the locking member 18 is in the state of extending into the locking groove 112, and the cover body assembly is locked on the machine body 101. In this state, brewing can be carried out to ensure the safety of the brewing process. As shown in FIG. 14 to FIG. 16, when it is necessary to open the upper cover 1 assembly after brewing, the pulling part 25 is first pulled. The pushing part pushes the sliding member 16. The sliding member 16 moves forward and drives the rotating rod 31 to rotate. At the same time, the rotating rod 31 drives the locking part to move backwards and be disengaged from the locking groove 112, thus unlocking the cover body assembly and the machine body 101 and enabling the cover body assembly to be opened. The locking member 18 in this embodiment comprises a body and a locking bolt protruding from the body. The locking bolt can extend into the locking groove 112 to realize locking.

In some embodiments, as shown in FIG. 7, the peripheral edges of the upper cover 1 except the pivoting side are all raised upwards to form flanges 34, the flange 34 on the side far away from the pivoting side is provided with a gap 35, the upper cover 1 is provided with a notch 36 near the gap 35, the opposite sides of the notch 36 are provided with a second lug opposite to the first lug 23 on the pulling member 17, the pulling member 17 is pivoted to the notch 36 through a rotating shaft 26 penetrating through the first lug 23 and the second lug, and the pulling part 25 is located in the gap 35 and protrudes from the front side of the upper cover 1 to facilitate pulling. When the pulling part 25 is pulled upwards, the pushing part is rotatable downwards and enters between the upper cover 1 and the lower cover 2 through the notch 36 to push the sliding member 16.

With continued reference to FIG. 7, the bottom surface of the lower cover 2 is concave toward the upper cover 1 to form a groove 37, the front side of the groove 37 is in communication with the outside, and the rear side of the groove 37 is provided with a through hole 29 (not shown in the figure due to shading) communicating between the upper cover 1 and the lower cover 29. The top of the machine body 101 is provided with a boss 111. Referring to FIG. 7 and cooperating with FIG. 17, the locking groove 112 is provided on the boss 111. When the cover body assembly is closed, the boss 111 extends into the groove 37, and the locking member 18 extends into the locking groove 112 through the through hole 29 to realize locking, thereby fixing the cover body assembly on the machine body 101.

Figure 17:
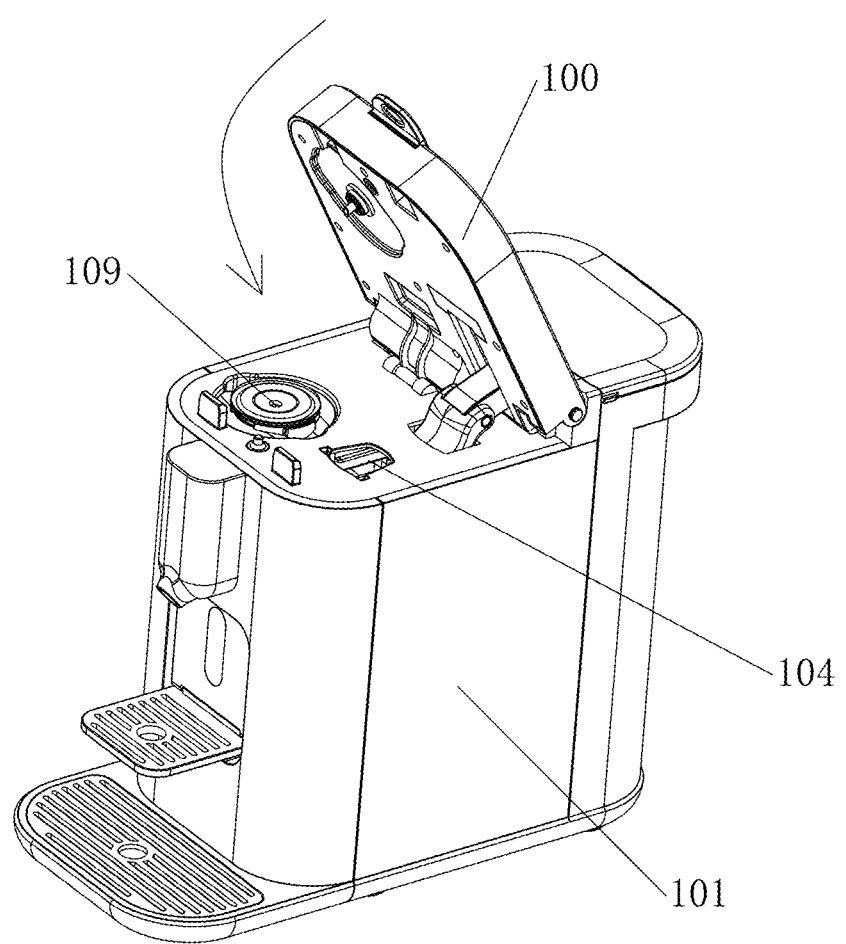
FIG. 17 is a structural schematic diagram of a capsule coffee machine according to the embodiment of the present utility model, in which an uncovering device is in an open state.
Figure 18:
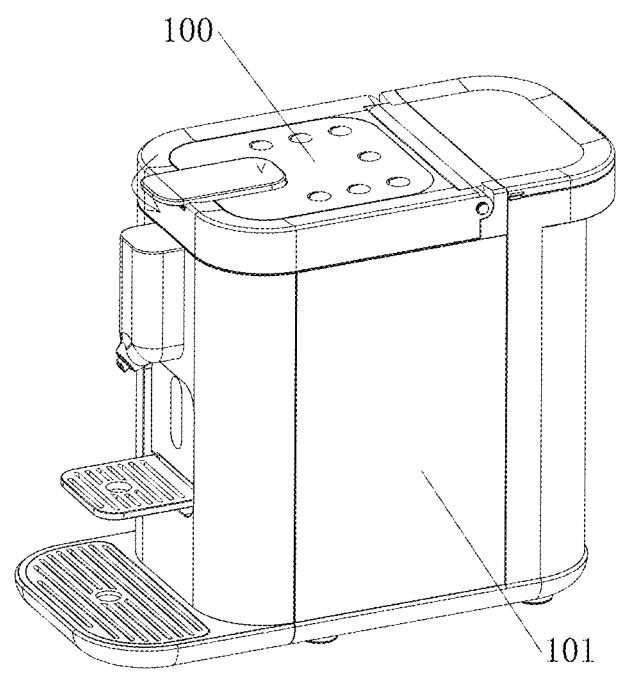
FIG. 18 is a structural schematic diagram of a capsule coffee machine according to the embodiment of the present utility model, in which an uncovering device is in a closed state.

As shown in FIG. 17 and FIG. 18, at the same time, the embodiment of the present utility model provides a capsule coffee machine, comprising a machine body 101 and the above-mentioned uncovering device 100 of the capsule coffee machine. A first brewing assembly 105 is provided in the machine body 101. The uncovering device 100 is hinged to the machine body 101, the top of the machine body 101 is provided with a through groove 104, and the connecting rod assembly of the uncovering device 100 is rotatably connected to a brewing seat 108 or a brewing head 107 of the first brewing assembly 105 through the through groove 104, and drives the brewing seat 108 and the brewing head 107 to move relatively transversely to combine or separate the brewing seat and the brewing head, so as to compress the coffee capsule 110 and realize brewing. The capsule coffee machine with the uncovering device 100 is reasonable in structure, convenient to operate, and excellent in user experience. In order to improve the coffee brewing efficiency and meet the demands of many people drinking coffee at the same time, two first brewing assemblies 105 can be provided in the machine body 101 at the same time, and the two first brewing assemblies 105 are provided in parallel in the machine body 101. At the same time, the uncovering device 100 comprises two connecting rod assemblies for pushing the two first capsule assemblies to squeeze the coffee capsules 110 to brew coffee, respectively, as shown in the figure.

As shown in FIG. 1 and FIG. 6, the first brewing assembly 105 of the capsule coffee machine further comprises two opposite plate holders 113, opposite guide grooves 114 are provided on the two plate holders 113, the length direction of the guide grooves 114 is the same as the relative movement direction of the brewing seat 108 and the brewing head 107. The brewing head 107 is provided between the two plate holders 113 and close to one end of the two plate holders, the brewing seat 108 comprises a seat body 115 and guide sliders 116 provided on opposite sides of the seat body 115, the guide sliders 116 are provided in the guide grooves 114, and the connecting rod assembly is rotatably connected to the side of the seat body 115 away from the brewing head 107, so that when the cover body assembly is closed, the connecting rod assembly drives the guide sliders 116 of the seat body 115 to slide along the guide grooves 114, so that the brewing seat 108 can stably and smoothly follow a predetermined trajectory, ensuring the smooth progress of coffee brewing.

The capsule coffee machine of this embodiment further comprises a second brewing assembly 106 capable of brewing American coffee, in addition to a first brewing assembly 105 capable of brewing Italian coffee. When the second brewing assembly 106 is provided in the machine body 101, the lower cover 2 of the uncovering device 100 is provided with a piercing needle 14 for piercing the coffee capsule 110, as shown in FIG. 4 to FIG. 6.

The above description is intended to be illustrative rather than limiting. For example, the above examples (or one or more schemes thereof) can be used in combination with each other, and it is considered that these embodiments can be combined with each other in various combinations or arrangements. The scope of the present utility model should be determined by referring to the appended claims and the full range of equivalents given by these claims.

The invention claimed is:

1. An uncovering device of a capsule coffee machine, comprising:
    a machine body;
    a first brewing assembly provided in the machine body, wherein the first brewing assembly further comprises a brewing head and a brewing seat,
    a cover body assembly pivoted to the machine body at a rear side and comprising an upper cover and a lower cover which are fastened to each other,
    a sealing cover which cooperates with the inner surface of the lower cover to define a sliding cavity is provided between the upper cover and the lower cover,
    a sliding groove extending from the rear side to the front side of the cover body assembly provided in the lower cover, wherein the sliding groove is in communication with the sliding cavity;
    a sliding shaft provided in the sliding cavity, wherein both ends of the sliding shaft are located at the opposite sides of the sliding groove; and
    a connecting rod assembly, wherein one end of the connecting rod assembly is rotatably connected to the sliding shaft through the sliding groove, another end of the connecting rod assembly is rotatably connected to the brewing seat or the brewing head of the first brewing assembly to drive the sliding shaft to move in the sliding cavity in a length direction of the sliding groove and drive the connecting rod assembly to move when the cover body assembly is closed and opened, so that the connecting rod assembly drives the brewing seat or the brewing head to move transversely to achieve combination or separation of the brewing seat and the brewing head.

2. The uncovering device of a capsule coffee machine according to claim 1, further comprising two sliding grooves provided in parallel and two connecting rod assemblies each corresponding to one of the two sliding grooves; and wherein the machine body is provided with two first brewing assemblies each corresponding to one of the two connecting rod assemblies.

3. The uncovering device of a capsule coffee machine according to claim 1, wherein the lower cover is provided with a piercing needle; wherein the machine body is further provided with a second brewing assembly, wherein a capsule inlet of the second brewing assembly is provided towards the lower cover, so that when the cover body assembly is closed, the piercing needle extends into the second brewing assembly through the capsule inlet and pierces the coffee capsule in the second brewing assembly.

4. The uncovering device of a capsule coffee machine according to claim 1, wherein the connecting rod assembly further comprises a first connecting rod, a second connecting rod and a third connecting rod, wherein the first connecting rod further e a first arm and a second arm, wherein one end of the first arm is rotatably connected to the sliding shaft through the sliding groove, wherein another end of the first arm is connected to one end of the second arm and forms an inflection point, and wherein another end of the second arm is rotatably connected to a first rotating shaft provided on the brewing seat; wherein one end of the second connecting rod is rotatably connected to the first arm through a second rotating shaft, wherein another end of the second connecting rod is rotatably connected to one end of the third connecting rod, and wherein another end of the third connecting rod is rotatably connected to the brewing seat.

5. The uncovering device of the capsule coffee machine according to claim 1, wherein the top of the machine body is provided with a locking groove; wherein the uncovering device further comprises a locking assembly provided on the cover body assembly, wherein the locking assembly comprises:
    a limit sliding groove provided on the inner surface of the lower cover;
    a sliding member provided in the limit sliding groove and capable of moving back and forth in the limit sliding groove;
    a pulling member rotatably provided on the upper cover, so that one end of the pulling member forms a pulling part, and another end of the pulling member forms a pushing part which rotates downwards when the pulling part is pulled upwards, wherein the pushing part is configured to push the sliding member to move back and forth in the limit sliding groove;
    a reset member, both ends of which act on the sliding member and the lower cover, respectively, to exert an acting force on the sliding member to move backward; and
    a locking member provided between the upper cover and the lower cover and linked with the sliding member to push the locking member to move back and forth when the sliding member moves back and forth to lock or unlock the locking groove.

6. The uncovering device of the capsule coffee machine according to claim 5, wherein the sliding member further comprises a slider, two locking members, and a connecting part convexly provided on the slider, and wherein the connecting part is provided with two through holes; wherein each of the two locking members is provided with a long hole;

the locking assembly further comprises two rotating rods, wherein the two rotating rods are rotatably connected to the lower cover through a shaft rod penetrating through the middle of the rotating rods, wherein a protruding posts are provided at both ends of the rotating rods, wherein one of the protruding posts penetrates through the through hole, and the other of the protruding posts penetrates through the long hole; when the sliding member moves back and forth to drive the rotating rods to rotate, the rotating rods drive the two locking members to move back and forth during rotation to lock or unlock the locking groove.

7. The uncovering device of the capsule coffee machine according to claim 5, wherein peripheral edges of the upper cover away from a pivoting side are raised upwards to form flanges, wherein a flange on the side far away from the pivoting side is provided with a gap, wherein the upper cover is provided with a notch near the gap, wherein the pulling member is pivoted to the notch, wherein the pulling part is provided in the gap and protrudes from the front side of the upper cover, and wherein when the pulling part is pulled upwards, the pushing part is rotatable downwards and enters between the upper cover and the lower cover through the notch to push the sliding member.

8. The uncovering device of the capsule coffee machine according to claim 5, wherein a bottom surface of the lower cover is concave toward the upper cover to form a groove, wherein a front side of the groove is in communication with the outside, wherein a rear side of the groove is provided with a through hole communicating between the upper cover and the lower cover; wherein the top of the machine body is provided with a boss, wherein the locking groove is provided on the boss, wherein when the cover body assembly is closed, the boss extends into the groove, and the locking member extends into the locking groove through the through hole to realize locking.

9. A capsule coffee machine, comprising a machine body in which a first brewing assembly is provided, wherein the capsule coffee machine further comprises an uncovering device of the capsule coffee machine according to claim 1 hinged to the machine body, wherein the top of the machine body is provided with a through groove, and the connecting rod assembly of the uncovering device is rotatably connected to a brewing seat or a brewing head of the first brewing assembly through the through groove, and drives the brewing seat and the brewing head to move relatively transversely to combine or separate the brewing seat and the brewing head.

10. The capsule coffee machine according to claim 9, wherein the first brewing assembly further comprises two opposite plate holders, wherein opposite guide grooves are provided on the two plate holders, respectively, wherein the length direction of the guide grooves is the same as the relative movement direction of the brewing seat and the brewing head; wherein the brewing head is provided between the two plate holders and close to one end of the two plate holders on the same side, wherein the brewing seat further comprises a seat body and wherein guide sliders are provided on opposite sides of the seat body, wherein the guide sliders are provided in the guide grooves, and wherein the connecting rod assembly is rotatably connected to the side of the seat body away from the brewing head, so that when the cover body assembly is closed, the connecting rod assembly drives the guide sliders of the seat body to slide along the guide grooves.

* * * * *